Nov. 27, 1951  C. B. WELLER  2,576,430
CHENILLE MAKING MACHINE
Filed Oct. 22, 1948  10 Sheets-Sheet 2
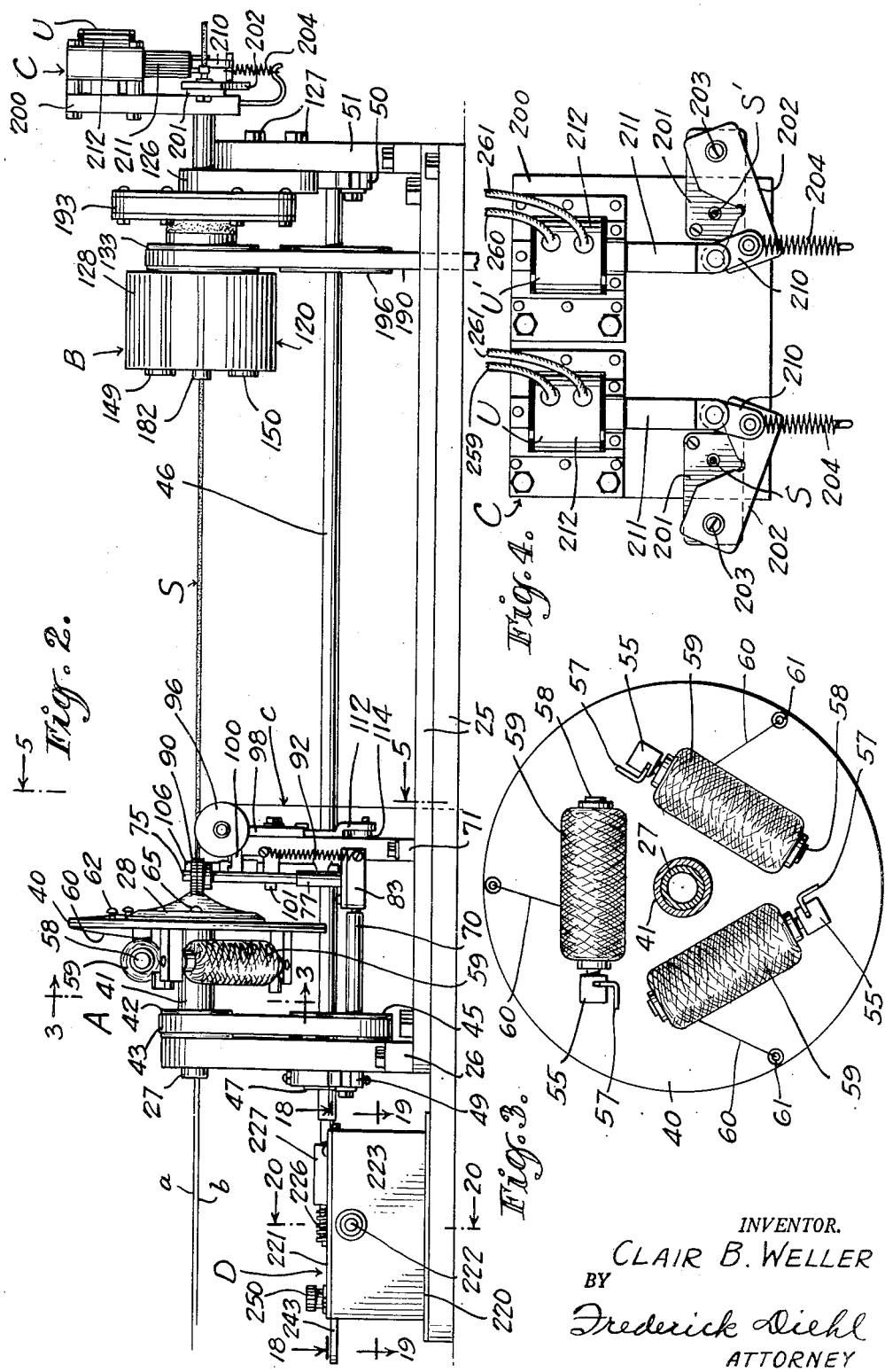
INVENTOR.
CLAIR B. WELLER
BY
Frederick Diehl
ATTORNEY

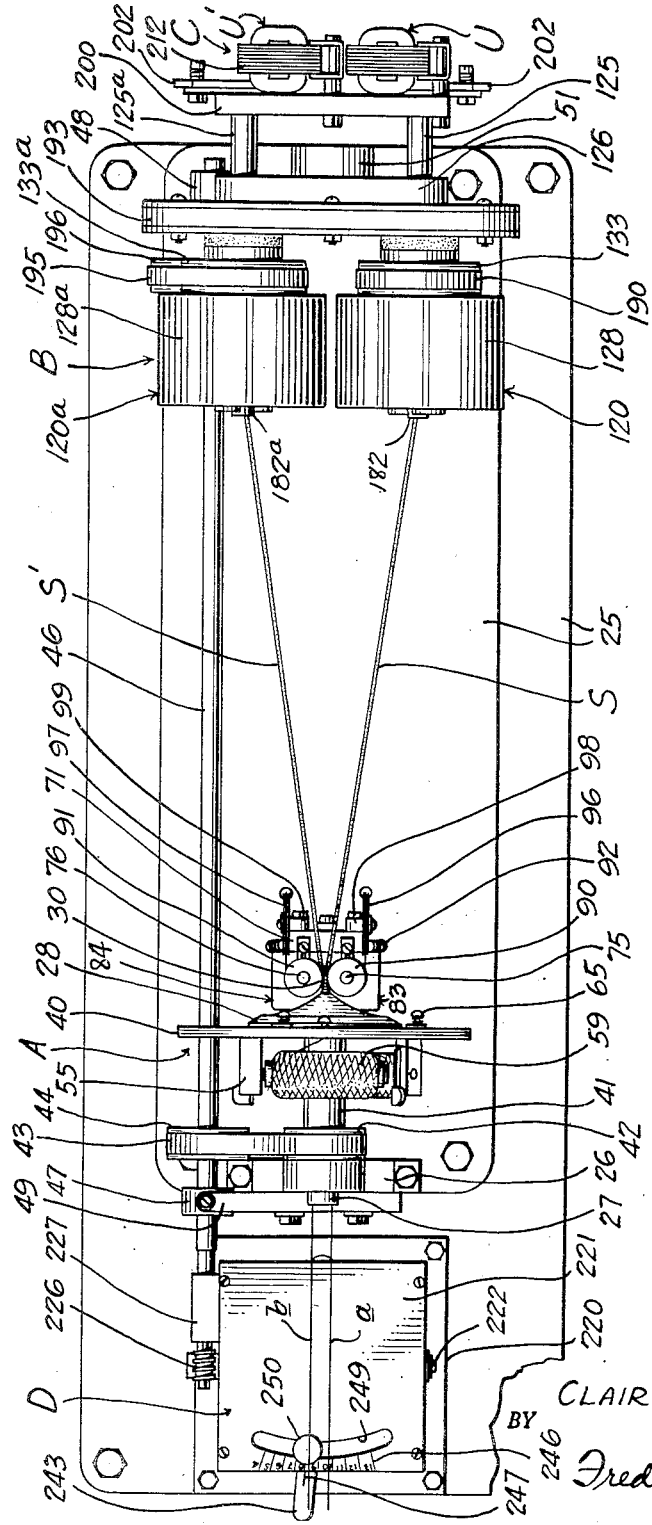

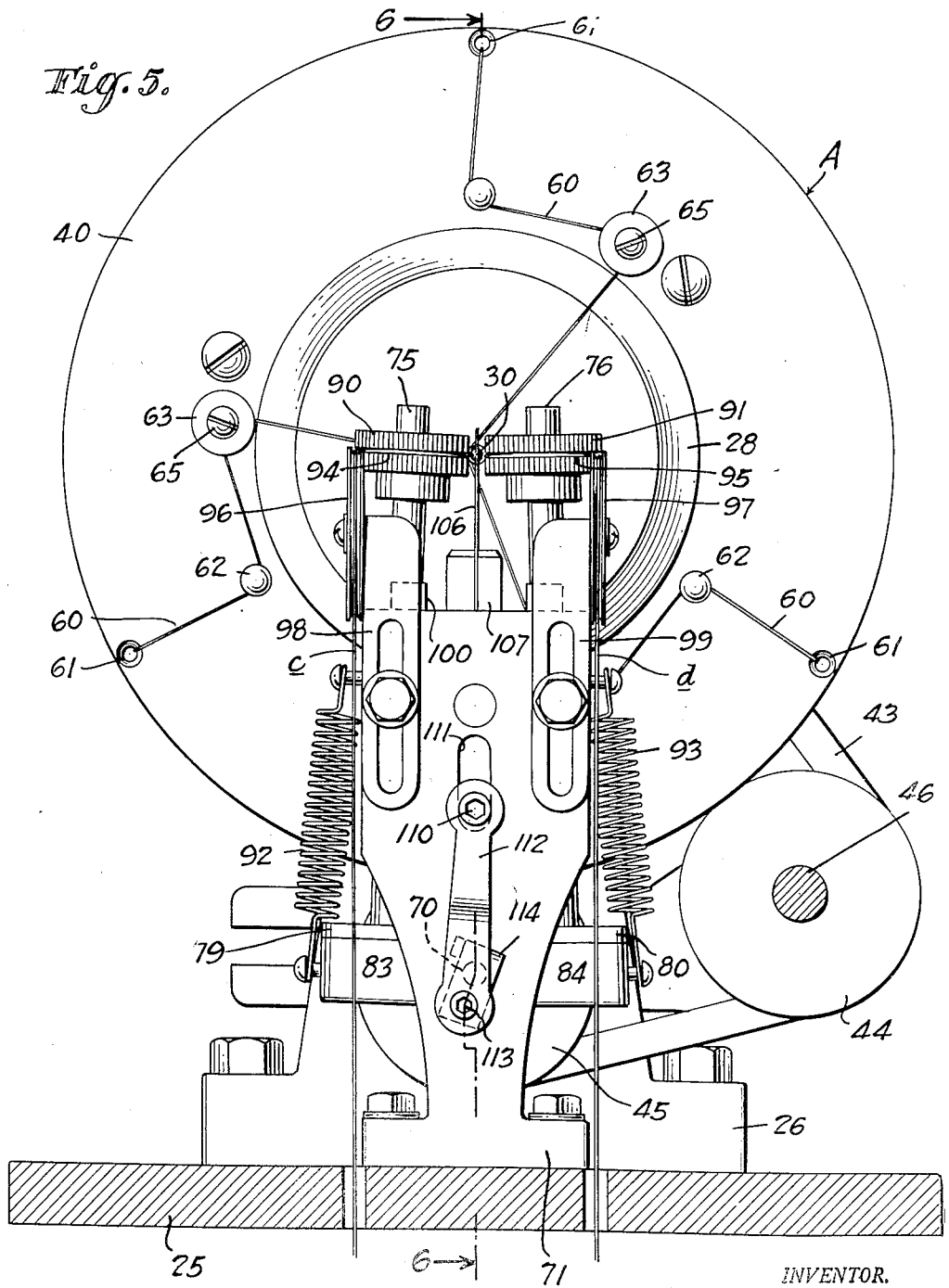

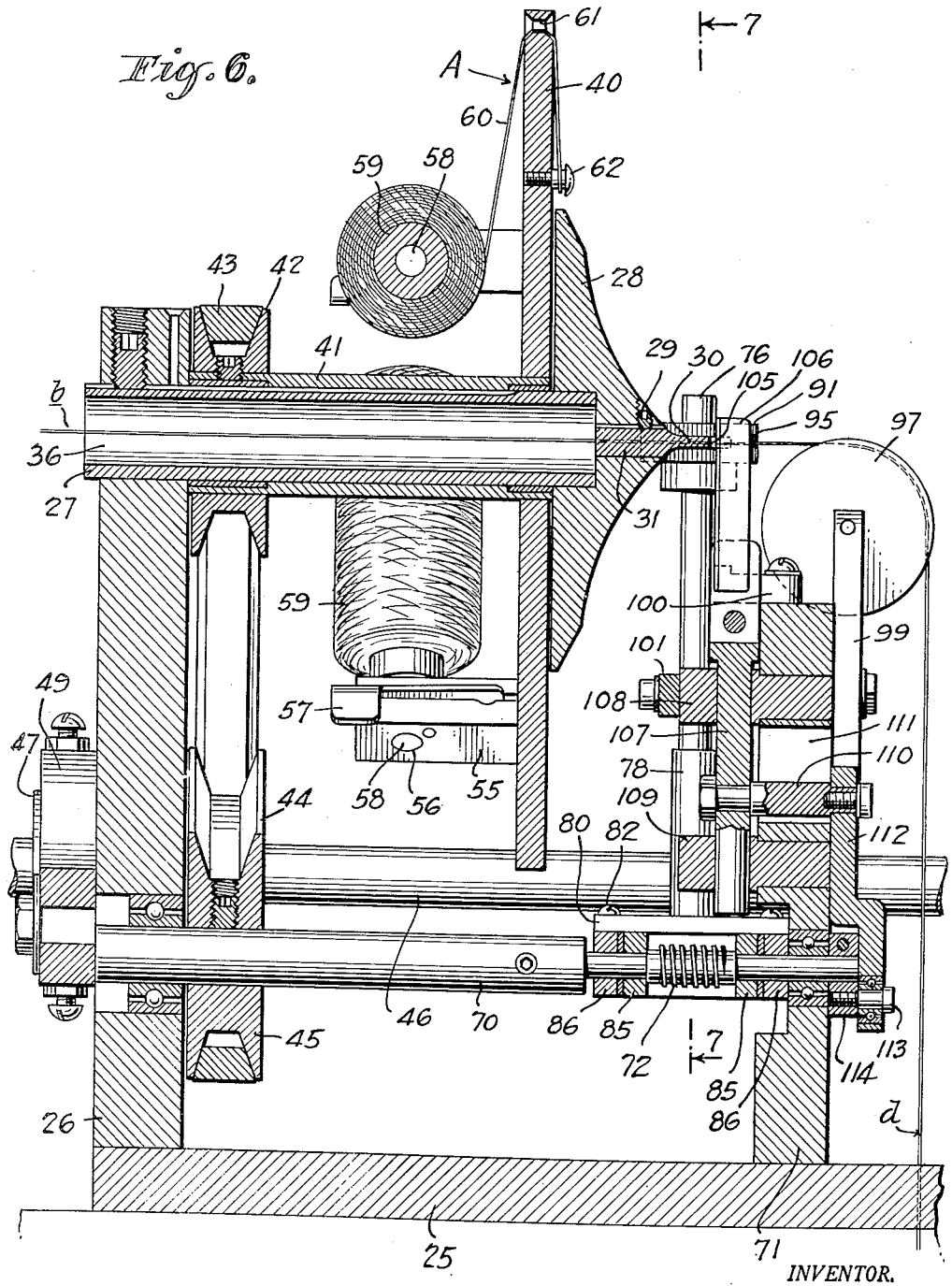

Nov. 27, 1951   C. B. WELLER   2,576,430
CHENILLE MAKING MACHINE
Filed Oct. 22, 1948   10 Sheets-Sheet 5

INVENTOR.
CLAIR B. WELLER
BY
Frederick Diehl
ATTORNEY

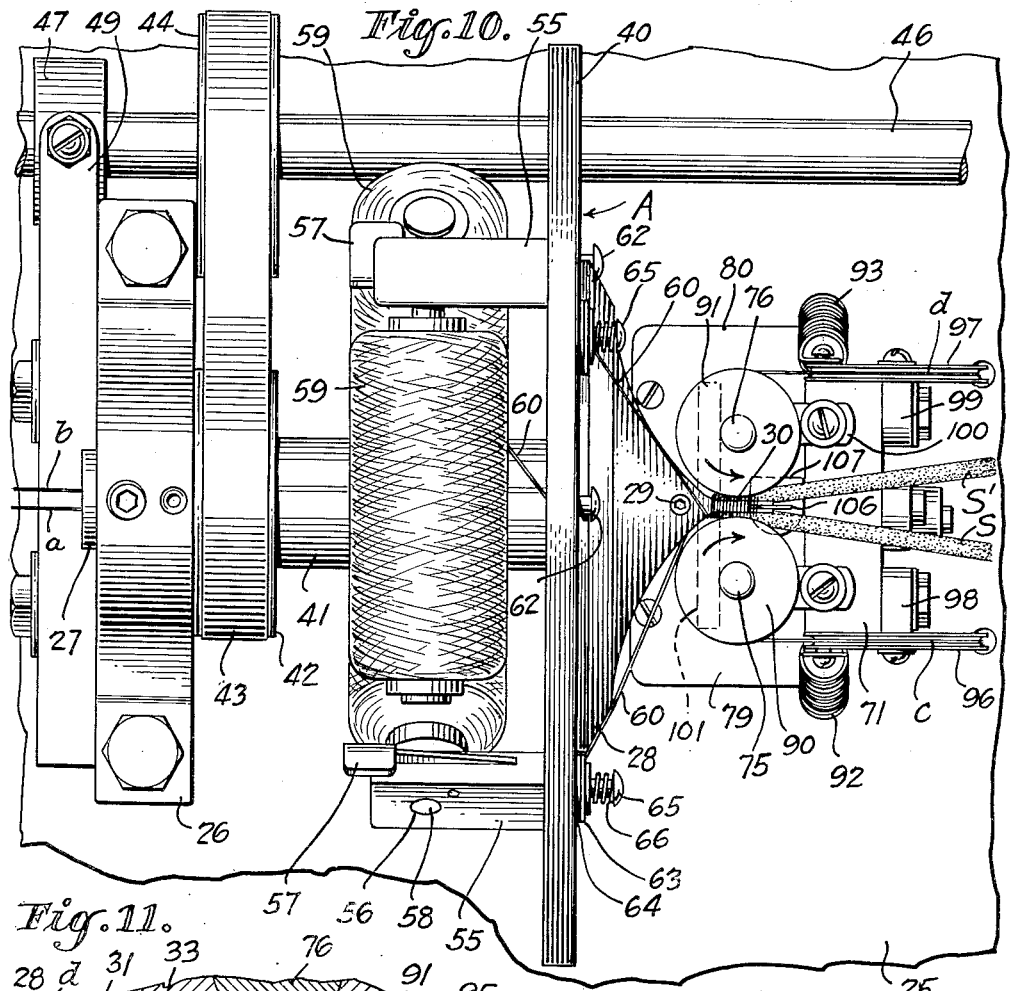
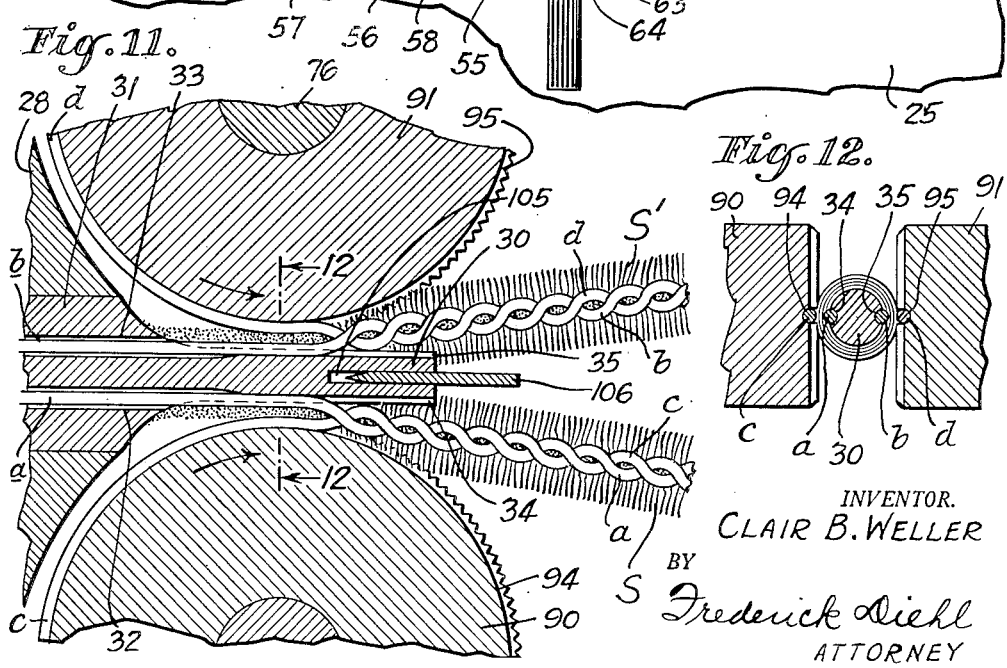

INVENTOR.
CLAIR B. WELLER
BY
Frederick Diehl
ATTORNEY

Nov. 27, 1951 C. B. WELLER 2,576,430
CHENILLE MAKING MACHINE
Filed Oct. 22, 1948 10 Sheets-Sheet 8
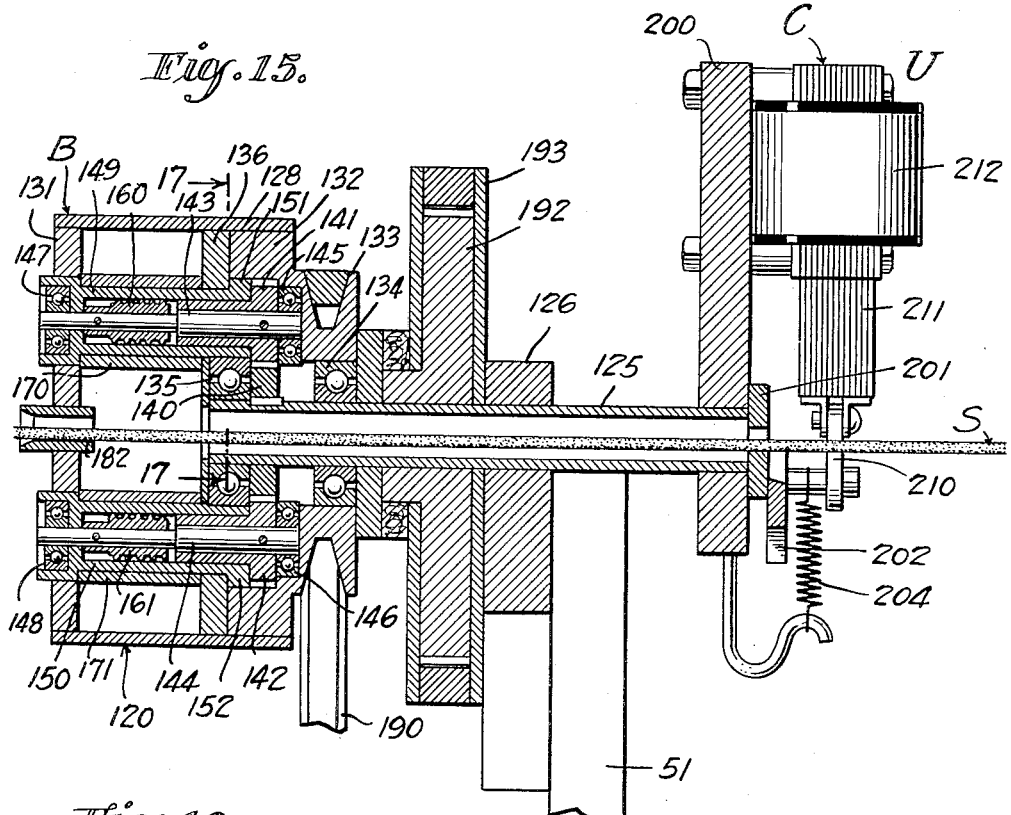
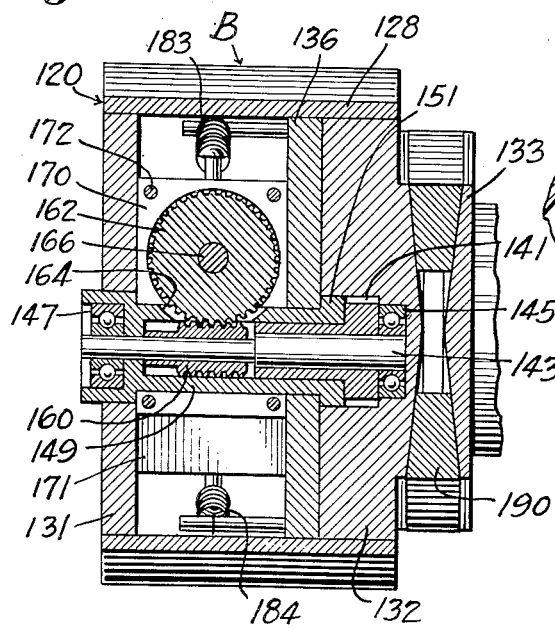
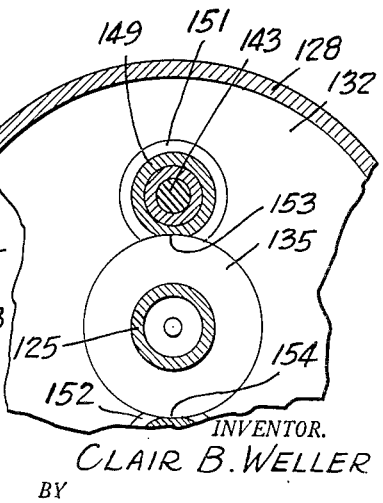
INVENTOR.
CLAIR B. WELLER
BY
Frederick Diehl
ATTORNEY Nov. 27, 1951

C. B. WELLER 2,576,430

Figures 18, 19:
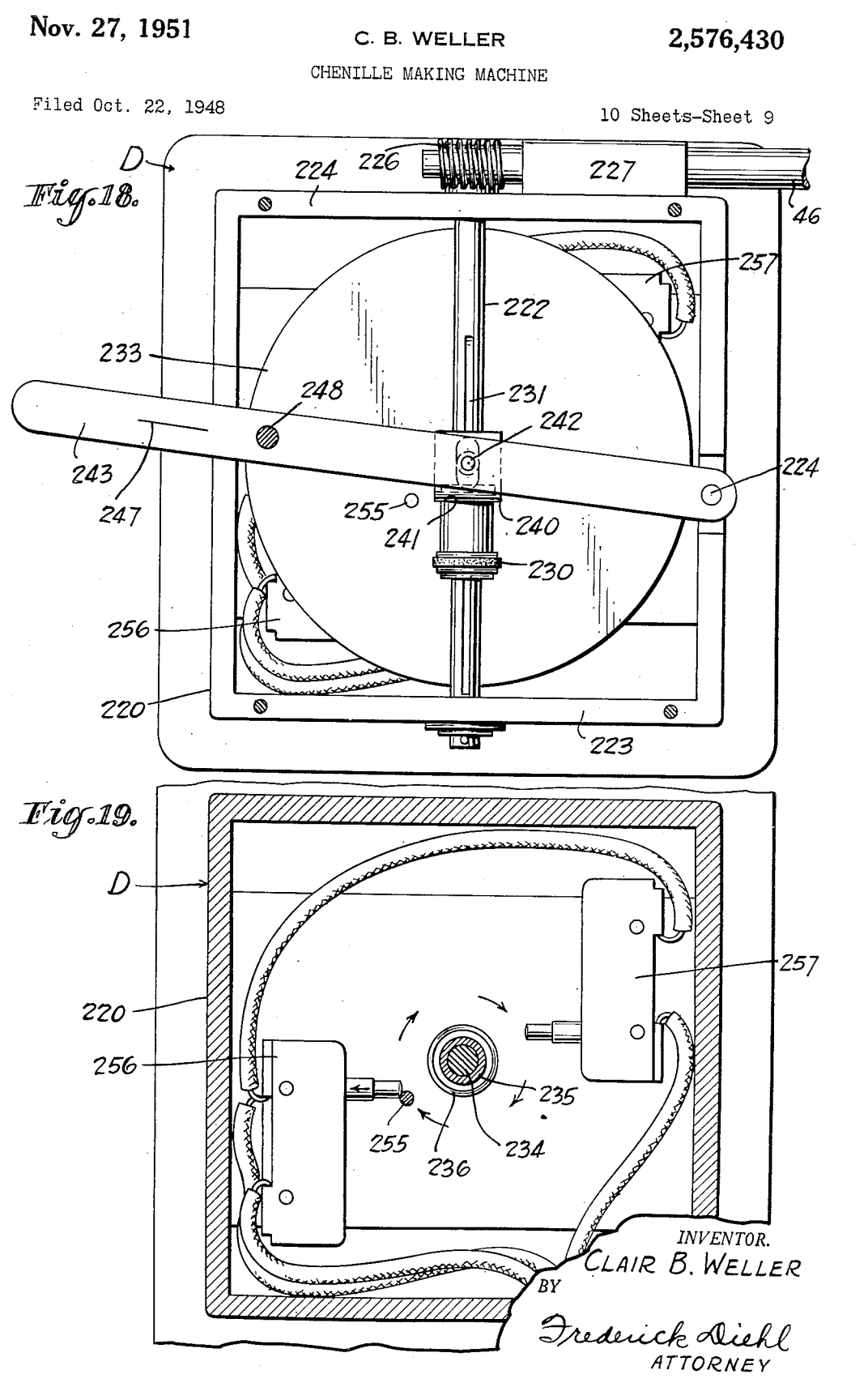

CHENILLE MAKING MACHINE

Filed Oct. 22, 1948

INVENTOR.
CLAIR B. WELLER
BY
Frederick Diehl
ATTORNEY

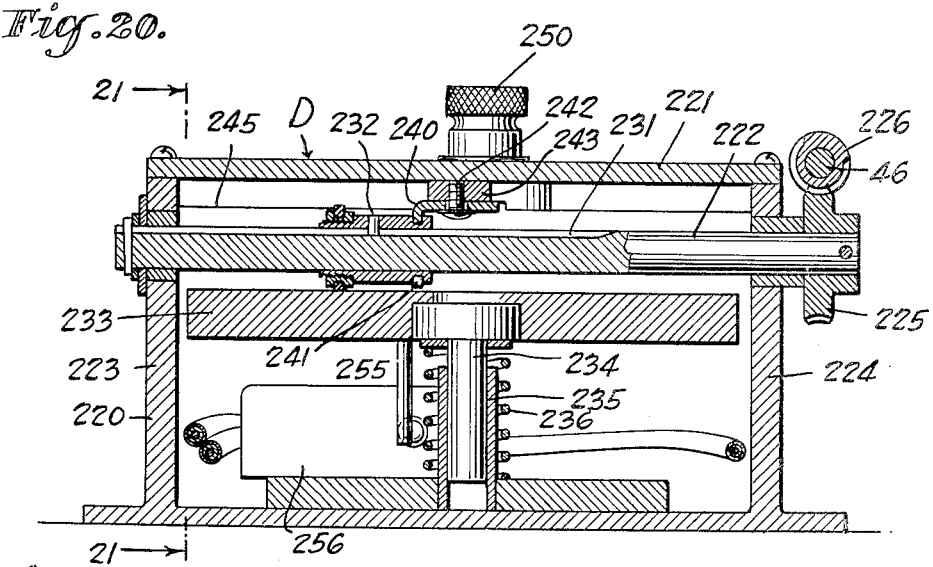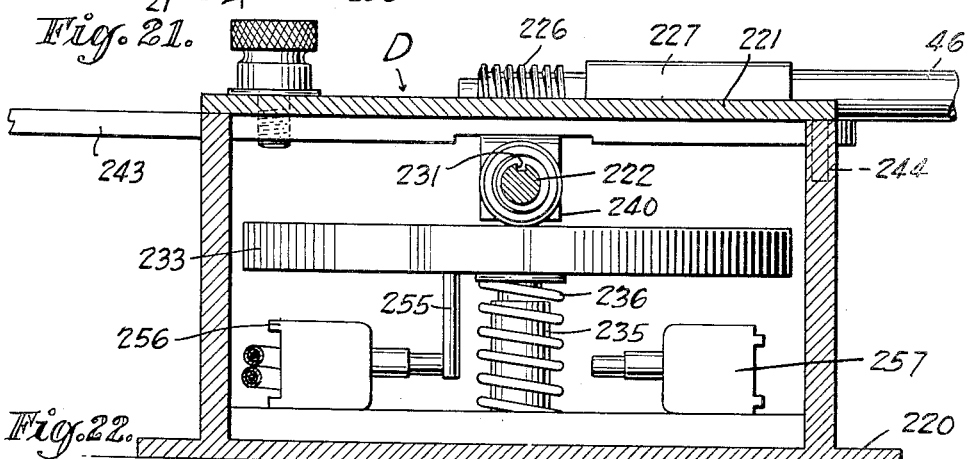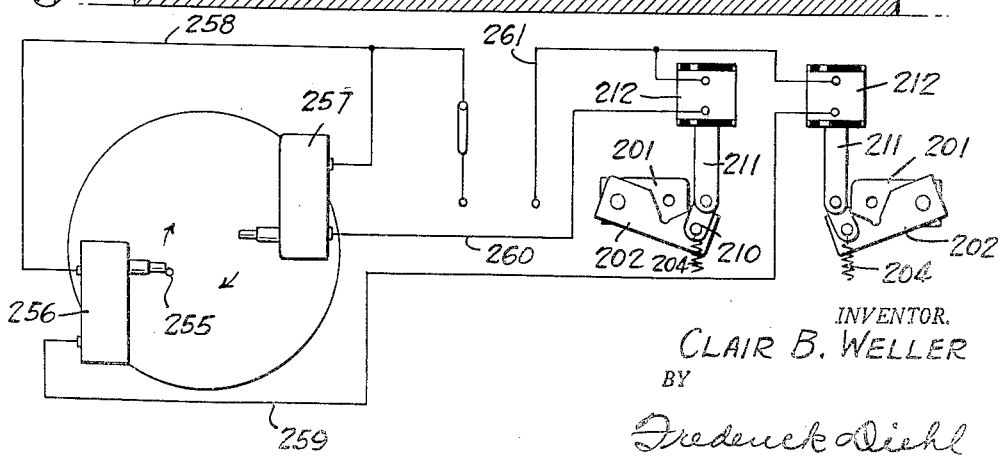

Patented Nov. 27, 1951

2,576,430

UNITED STATES PATENT OFFICE 2,576,430

CHENILLE MAKING MACHINE

Clair B. Weller, Burbank, Calif.

Application October 22, 1948, Serial No. 55,938

5 Claims. (Cl. 57—24)

This invention relates generally to the art of textiles, and more particularly to the manufacture of chenille strands.

An object of this invention is to provide a machine which is structurally characterized by its compactness and its automatic, continuous operation to produce a chenille strand of uniform quality whose structure is preferably, although not necessarily, composed of a core of twisted wires gripping the filaments or threads, and adapted for many products among which are cleaners for smoking pipes and plant and vegetable ties.

Another object of this invention is to provide a chenille machine in which two chenille strands are concurrently produced by using a single former or support on which the filaments such as cotton threads, for example, are wound and fed in the shape of a tube or cylinder as pairs of wires or cords are fed inside and outside of the tube and are twisted as the tube is cut through diametrically between the twisted pairs of wires, to produce the two chenille strands which are then cut into predetermined lengths in synchronism with the making of the strands, all to effect a continuous operation so long as stock is fed to the machine, whereby to economically produce the finished product.

With these and other objects in view, this invention resides in the combinations, arrangements and functional relationships of elements as set forth in the following specification and particularly pointed out in the appended claims.

In the accompanying drawings,

Figure 1 is a plan view of the chenille making machine embodying this invention;

Figure 2 is a view of the chenille making machine in side elevation;

Figure 3 is an enlarged detail sectional view taken on the line 3—3 of Figure 2;

Figure 4 is a detail view showing in front elevation, the stock cut-off mechanism embodied in the machine;

Figure 5 is an enlarged transverse sectional view taken on the line 5—5 of Figure 2;

Figure 6 is a longitudinal sectional view taken on the line 6—6 of Figure 5;

Figure 7:
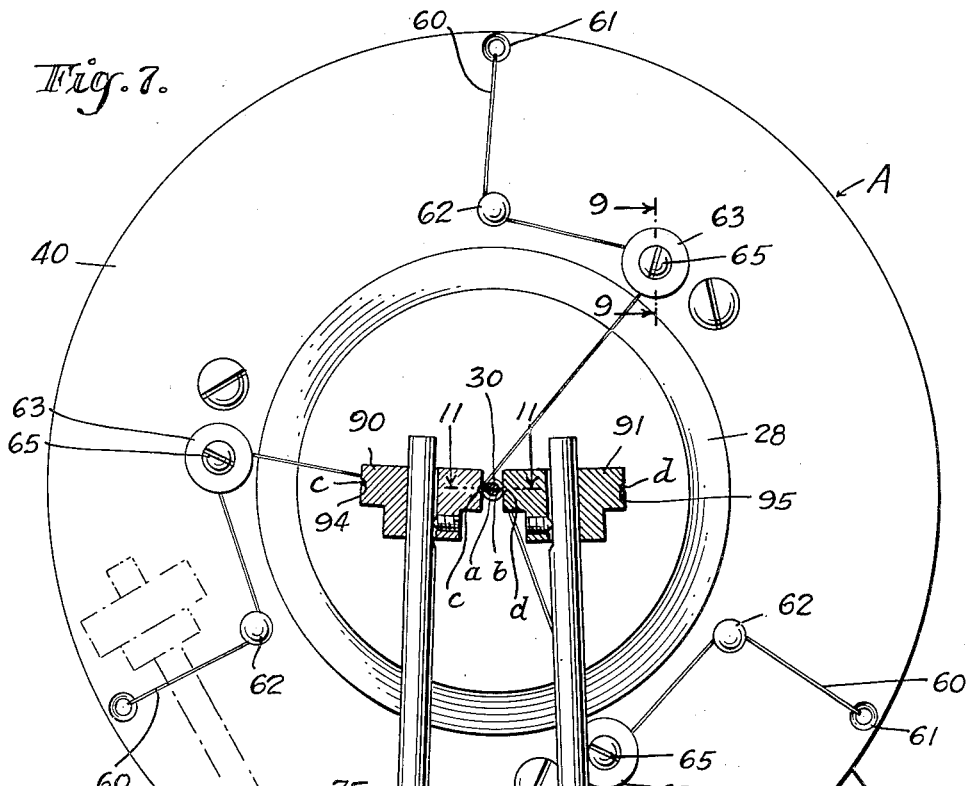
Figure 7 is a transverse sectional view taken on the line 7—7 of Figure 6.
Figure 9:
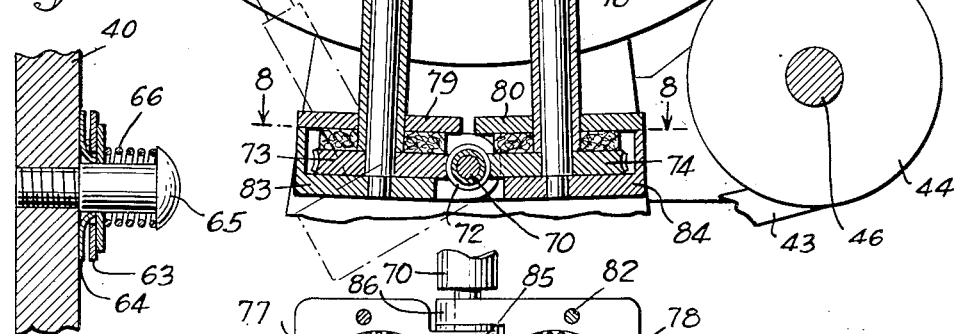
Figure 8:
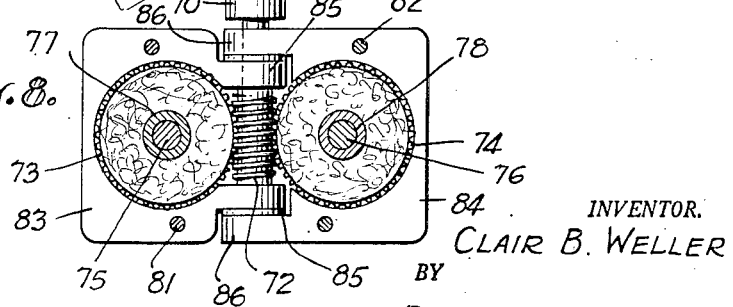

Figures 8 and 9 are fragmentary detail sectional views taken, respectively, on the lines 8—8 and 9—9 of Figure 7;

Figure 10 is an enlarged fragmentary plan view of the winding and forming mechanisms embodied in the machine;

Figure 11 is a magnified detail sectional view taken on the line 11—11 of Figure 7;

Figure 12 is a fragmentary detail sectional view taken on the line 12—12 of Figure 11;

Figure 13 is a vertical transverse sectional view taken on the line 13—13 of Figure 14, and illustrating a twisting and feeding mechanism embodied in the machine;

Figure 14 is a horizontal sectional view taken on the line 14—14 of Figure 13;

Figures 15 and 16 are sectional views taken, respectively, on the lines 15—15 and 16—16 of Figure 13;

Figure 17 is a fragmentary sectional view taken on the line 17—17 of Figure 15;

Figures 18 and 19 are horizontal sectional views taken on the lines 18—18 and 19—19, respectively, of Figure 2;

Figure 20 is a vertical sectional view taken on the line 20—20 of Figure 2;

Figure 21 is a vertical sectional view taken on the line 21—21 of Figure 20; and Figure 22 is a diagrammatic view illustrating the electrical circuits associated with timing and cut-off mechanisms embodied in the machine.

Referring specifically to the drawings, this invention in its broad aspect, comprises a mechanism A which includes means for forming a tube or cylinder of cotton or other threads, a means for delivering a plurality of wires or cords to the tube as same is being fed, and a means for cutting through the tube diametrically to divide the tube into separate halves for the making of two chenille strands concurrently. A mechanism B synchronized with the mechanism A includes means for feeding the wires or cords and for twisting same to complete the making of the two chenille strands. A cut-off mechanism C under the control of a timing mechanism D synchronized with the mechanisms A and B, severs the completed chenille strands into predetermined lengths for specific uses.

The mechanisms A, B, C and D, are supported on a base 25, and the mechanism A comprises a bracket 26 fixed to the base and having an opening therethrough in which is fixed one end of a tubular shaft 27, the other end of which rigidly supports a conical head 28 in which is centrally fixed by a set screw 29, a cylindrical support or former 30, the enlarged body portion 31 of which is provided with longitudinal bores 32 and 33 (Figure 11) at diametrically opposed points and terminating at their outer ends in longitudinal grooves 34 and 35, respectively, in the periphery of the former. These grooves are adapted to receive certain wires or cords a and b used in the making of the chenille strands and fed from suitable reels (not shown) through the bore 36 of the shaft 27.

A winding element in the form of a relatively large disk 40 is provided with a hub 41 journaled on the stationary shaft 27 to mount the disk in proximity to the head 28 for rotation about a fixed axis. A pulley 42 is fixed to the hub 41 and is adapted to drive the winding element in a clockwise direction as viewed in Figures 5 and 7, by means of a belt 43 trained about the pulley 41 and about other pulleys 44 and 45, the former of which is fixed to a countershaft 46 journaled in bearings 47 and 48 carried by arms 49 and 50, respectively, supported by the bracket 26 and by a second bracket 51 fixed to the base 25.

Projecting from the back of the disk 40 at equally spaced locations circumferentially are posts 55 having transverse bores 56 in which are releasably retained by latches 57, pins 58. Rotatably mounted on the pins 58 are spools 59 of thread 60 such as cotton, which, in the manufacture of cleaners for smoking pipes, are three-thread strands. In the present instance, three spools are carried by the disk 40, so as to actually wind nine threads of cotton upon the former 30 during the operation of the machine.

The threads 60 from the spools 59 are passed through guide openings 61 in the disk 40 adjacent to the periphery thereof, and then around headed pins 62 from which the threads pass between tensioning plates 63 and 64 (Figure 9) mounted on pins 65 projecting from the front of the disk adjacent to the periphery of the head 28 as shown in Figures 5 and 7. Coil springs 66 are mounted on the pins 65 to impose sufficient pressure on the respective plates 64 to maintain the threads taut as they are wound upon the former 30 during rotation of the winding element 40.

The pulley 45 is fixed to a jack shaft 70 journaled at one end in the bracket 26, and adjacent to its other end in a bracket 71 fixed to the base 25. Also fixed to the shaft 70 and adjacent to the bracket 71 is a worm 72 constantly meshing with worm gears 73 and 74 fixed to shafts 75 and 76, respectively, journaled in bearings 77 and 78 supported by plates 79 and 80 forming covers removably secured by screws 81 and 82 on the open sides of gear cases 83 and 84 having pairs of ears 85 and 86 by which the cases are pivotally mounted on the shaft 70 at opposite ends of the worm 72, for angular adjustment about the axis of the shaft in order not to vary the meshing relationship of the gears 73 and 74 with the worm 72.

At their upper ends the shafts 75 and 76 are provided with feed rollers 90 and 91, respectively, having milled peripheries. Springs 92 and 93 connect the respective gear cases 83 and 84 with the bracket 71 so as to yieldingly urge the cases about the axis of the worm shaft 70 in directions to force the peripheries of the respective feed rollers 90 and 91 into engagement with the convolutions of thread wound upon the former 30, so that upon rotation of the rollers in the opposite directions indicated by the arrows in Figures 10 and 11, the tube defined by the convolutions of thread on the former will be fed axially thereon towards its free end.

The feed rollers 90 and 91 are provided with circumferential grooves 94 and 95, respectively, which, in the active positions of the rollers shown in Figures 10, 11 and 12, are directly opposite the longitudinal grooves 34 and 35, respectively, of the former, at the points of engagement of the rollers with the wound thread on the former. The grooves 94 and 95 receive other wires or cords c and d used in the making of the chenille strands, which wires are trained over idler pulleys 96 and 97 rotatably mounted by adjustable arms 98 and 99 on the bracket 71, and are supplied from suitable reels (not shown) through openings in the base 25.

Guide lugs 100 and 101 supported by the bracket 71 co-act to confine the shafts 75 and 76 against lateral displacement yet permit the shafts to be swung outwardly and remain in the inactive position shown in broken lines at the left side of Figure 7, upon disconnecting the springs 92 and 93, for unrestricted access to the former 30.

The former 30 is provided with a diametrical slot 105 opening to the outer or free end of the former. As viewed in Figure 12, the length of the slot 105 is perpendicular to a line passing through the grooves 34, 35 and 94, 95 in the former and feed wheels 90, 91, respectively. Working in the slot 105 is a knife in the form of a wafer type cutting blade 106 which is secured to a bar 107 reciprocably mounted in bearings 108 and 109 projecting from the bracket 71. A pin 110 is rigidly secured to the bar 107 to project laterally therefrom and freely through a slot 111 in the bracket 71. A connecting rod 112 is pivotally connected at one end to the pin 110 and at its other end to a crank pin 113 carried by a crank 114 fixed to the free end of the jack shaft 70, so that rotation of the latter will, by a crank motion, rapidly reciprocate the cutting blade 106 to cut diametrically through the tube of threads wound on the former 30 as the tube is fed axially thereon by the feed rollers 90 and 91 into the cutting edge of the blade.

The mechanism B comprises two identical feeding and twisting elements 120 and 120a which are identical in construction except for being relatively right and left hand. These elements are arranged side by side in close proximity, and are mounted for rotation upon spaced parallel axes at a distance from the mechanism A. Like reference characters will be used to designate like parts of the two elements 120 and 120a, with the parts of one element provided with exponents to distinguish them from the parts of the other element.

Each of the elements 120 and 120a comprises a tube 125, 125a rigidly secured to a support 126, which latter is secured to the bracket 51 by bolts 127 (Figure 2). An open-ended cylindrical shell 128 is secured by screws 129 and 130 to end plates 131 and 132, respectively, for co-action therewith in providing a cylindrical case enclosing the moving parts of the mechanism. The plate 132 is provided with a flanged pulley 133 by which the respective element may be rotated on bearings 134 and 135 supported on the tube 125 and in the plate 132 and in a retainer plate 136 which abuts the inner face of the plate 132.

A sun gear 140 is fixed to the stationary tube 125 and constantly meshes with identical planetary gears 141 and 142 fixed to shafts 143 and 144, respectively, journaled at one end in bearings 145 and 146 in the plate 132, and at the other end in bearings 147 and 148 in the outer ends of bearing sleeves 149 and 150 supported in alined openings in the end plate 131 and retainer plate 136, respectively. Heads 151 and 152 on the inner ends of the respective bearing sleeves 149 and 150 co-act with the retainer plate 136 to confine the sleeves against axial displacement towards the end plate 131, and the heads 151 and 152 are provided with arcuate cut-outs 153 and 154 (Figure 17) which co-act with the periphery of the bearing 135 in preventing rotation of the sleeves about their own axes.

Fixed to the shafts 143 and 144 within the respective bearing sleeves 149 and 150 are worms 160 and 161, respectively, which constantly mesh with worm gears 162 and 163 projecting into the respective bearing sleeves through slots 164 and 165 therein. The worm gears 162 and 163 are fixed to shafts 166 and 167 journaled in bearings 168 and 169 in the sections of two-part gear boxes 170 and 171 which constitute arms. The parts of the boxes 170 and 171 are secured together by screws 172 and 173 and are provided on their confronting sides with semi-circular recesses 174 and 175 (Figure 13) receiving the respective bearing sleeves 149 and 150 to mount the boxes thereon for pivotal movement about the axes of the respective shafts 143 and 144.

The shafts 166 and 167 are extended in opposite directions from the respective boxes 170 and 171 and have fixed thereto feed wheels 180 and 181 whose milled peripheries are directly opposed for co-action in engaging a chenille strand entering the element 120 through a guide tube 182, for feeding of the strand through the tube 125. Springs 183 and 184 connect the respective boxes 170 and 171 to the plate 136 for co-action in urging the feed wheels 180 and 181 into gripping engagement with the chenille strand, so that upon rotation of the elements 120 and 120a in the opposite directions indicated by the arrows in Figure 13, the pairs of feed wheels 180, 181 and 180a, 181a of the respective elements will be rotated in the opposed directions indicated by the arrows in Figure 14, so as to feed as well as twist the wires or cords forming the core of each chenille strand, in a manner to be later described.

A main driving belt 190 is trained about the pulley 133 and is adapted to be driven from a suitable source of power such as an electric motor (not shown), to drive the element 120, whose rotation is transmitted through pins 191 to a gear 192 rotatably mounted on the tube 125 within a housing 193 and constantly meshing with an identical gear 192a rotatably mounted on the tube 125a and transmitting its rotational movement to the element 120a through pins 191a, all as clearly shown in Figure 14. A second driving belt 195 is trained about the pulley 133a of the element 120a and about a pulley 196 fixed to the countershaft 46 to drive the latter and hence the winding disk 40 and feed rollers 90 and 91 in synchronism with the elements 120 and 120a.

The cut-off mechanism C comprises a support 200 through which project the outlet ends of the tubes 125 and 125a for conducting the completed chenille strands from the twisting and feeding mechanism B. The mechanism C includes two similar units U and U', so that a detailed description of one unit will suffice for both. Each unit is composed of a fixed cutting blade 201 secured to the support 200, and a movable cutting blade 202 pivoted at 203 on the blade 201 and normally urged by a spring 204 to the open position shown in Figure 4 to enable the completed chenille strand to be fed from the respective tube 125 or 125a between the shearing edges of the blades.

By means of a link 210 the movable blade 202 is operatively connected to the core 211 of a solenoid 212 fixed to the support 200. Current from a suitable source of supply may be delivered to the solenoids 212 of the units U and U' momentarily and alternately under the control of the timing mechanism D which comprises a housing including a body section 220 and a removable cover 221 closing the open top thereof. A drive shaft 222 is journaled in bearings in the opposed side walls 223 and 224 of the body section 220, and has fixed thereto exteriorly of the latter a worm gear 225 with which meshes a worm 226 fixed to the projecting end portion of the countershaft 46 which is additionally supported by a bearing 227 on the body section 220, all so as to drive the shaft 222 in synchronism with the mechanisms A and B.

A friction roller 230 is splined on the shaft 222 by means of a longitudinal groove 231 therein and a pin 232 entering the groove from the hub of the roller, for adjustment of the roller radially across the face of a friction disk 233 supported by a shaft 234 in a bearing 235 rising from the bottom of the body section 220. A coil spring 236 surrounding the bearing 235 urges the disk 233 axially into firm engagement with the periphery of the driving roller 230 so as to drive the disk at various angular velocities in accordance with the adjustment of the roller across the face of the disk.

For this adjustment a yoke 240 works in an annular groove 241 in the hub of the roller 230 and has a pin and slot connection 242 with an adjusting member in the form of a lever 243 pivoted at one end on a pin 244 on the body section 220 and projecting from the housing through a recess 245 in the body section to provide a handle by which the lever can be shifted to various positions in accordance with indicia 246 (Figure 1) on the cover 221 designating various lengths in inches and a co-acting index graduation 247 on the lever. A locking member for releasably retaining the lever 243 in any selected position of adjustment is in the form of a screw 248 threaded into the lever 243 and working freely in an arcuate slot 249 in the cover 221, with the screw having a knurled knob 250 by which it can be manipulated to clamp the lever to the cover or release the lever as desired.

Projecting from the disk 233 in parallelism with the axis thereof is a pin 255, which, during its circle of revolution as the disk is rotated, momentarily wipes against and closes the movable contacts of conventional spring-opened micro switches 256 and 257 arranged 180 degrees apart in the body section 220 for the switches to be alternately closed. The switches 256 and 257 are arranged in electrical circuits to respectively energize the solenoids 212, which circuits include a conductor 258 from the line to one contact of both switches; conductors 259 and 260 from the other contact of the switches to one end of the windings of the respective solenoids; and a conductor 261 from the other end of the windings of the respective solenoids back to the line, all as clearly shown in Figure 22.

The operation of the invention is as follows:

Assuming that the product to be made on the machine is for cleaning smoking pipes or ties for plants and vegetables, then the flexible members a, b, c and d will be relatively fine and somewhat stiff wires. However, it will be understood that in making other products, these flexible members might be of other material, and this disclosure and claims are therefore to be broadly construed accordingly. As chenille cleaners for smoking pipes are generally of a definite predetermined length such as six inches, for example, the lever 243 is adjusted and locked in the position wherein its graduation 247 is alined with the number "6" of the indicia 246 on the cover 221.

For the making of pipe cleaner chenille, the spools 59 of cotton thread or other material are mounted on the winding element 40 and the threads 60 from the respective spools are passed through the guide openings 61, then around the guide pins 62 and between the tensioning plates 63 and 64.

With the springs 92 and 93 disconnected and the shafts 75 and 76 swung to the inactive position shown in broken lines at the left side of Figure 7, the former 30 may be removed from the head 28 to permit the two wires $a$ and $b$ to be passed through the bore 36 of the shaft 27 and then through the bores 32 and 33 of the former 30, after which same is replaced in the head 28. The wires $a$ and $b$ are pulled through the former 30 sufficiently for them to be inserted through the guide sleeves 185 and 185$a$, respectively, of the respective feeding and twisting elements 120 and 120$a$, the wire $a$ being forced between the pair of feed wheels 180, 181 of the element 120, and the wire $b$ between the pair of feed wheels 180$a$, 181$a$ of the element 120$a$.

The ends of the threads 60 from the three spools 59 are now started on the former 30 by being wound by hand thereon in a counterclockwise direction as viewed in Figure 5. The wires $c$ and $d$ are trained about the idler pulleys 96 and 97 and then about the feed rollers 90 and 91 as the shafts 75 and 76 are returned to the active position of the feed rollers shown in full lines in Figure 7, after which the springs 92 and 93 are reconnected to urge the milled peripheries of the feed rollers into feeding engagement with the convolutions of the threads 60 which have been wound by hand on the former 30 over the wires $a$ and $b$ in the longitudinal grooves 34 and 35 in the former. The wires $c$ and $d$ will now be held by the feed rollers 90 and 91 against the outside of the convolutions of the threads 60 on the former directly opposite the wires $a$ and $b$, respectively.

The wires $c$ and $d$ are now pulled sufficiently beyond the feed rollers 90 and 91 for the wire $c$ to be inserted through the guide sleeve 185 of the feeding and twisting element 120 and forced between the pair of feed wheels 180, 181 alongside of the wire $a$, and for the wire $d$ to be inserted through the guide sleeve 185$a$ of the element 120$a$ and forced between the pair of feed wheels 180$a$, 181$a$ alongside of the wire $b$.

Power is now applied to the belt 190 to drive the machine. As the winding disk 40 rotates in a clockwise direction as viewed in Figure 5, the threads 60 are wound on the former 30 and are fed axially thereon towards the rapidly reciprocating cutting blade 106, concurrently with which the wires $a$ and $c$ which are being gripped between the feed wheels 180 and 181 of the element 120, will be advanced through the tube 125 by the rotational movement of these feed wheels and will be twisted by the revolving motions thereof in response to the rotational movement of the element 120. Simultaneously, the wires $b$ and $d$, which are likewise being gripped between the feed wheels 180$a$ and 181$a$ of the element 120$a$, will be advanced through the tube 125$a$ by the rotational movement of these feed wheels and will be twisted by the revolving motions thereof as the element 120$a$ rotates.

It will be noted from Figures 11 and 12, that as the thread tube wound upon the former 30 is being tightly gripped at diametrically opposed points between the wires $a$ and $c$ and the wires $b$ and $d$, the tube will be fed axially on the former 30 by the feed rollers 90 and 91 towards the cutting blade 106, so that upon reaching the latter, the tube will be cut through diametrically thereby medially between the gripped points of the tube.

As the twisting of the wires of each pair $a$, $c$ and $b$, $d$ starts at a point approximately opposite the cutting edge of the blade 106 as shown in Figure 11, the severed halves of the thread tube on the former 30 will be tightly gripped between the twisted pairs of wires and will project equally from opposite sides thereof to form the two chenille strands S and S'. It will be noted that the mechanism B does not exert any pull upon the chenille strands S and S', but is synchronized with the mechanism A to advance the strands at the same speed as they leave the mechanism A, so that in effect, slack is being continuously taken up and the strands maintained taut with a predetermined amount of twist sufficiently to securely grip the several threads between the respective pairs of wires, being imparted to the wires by the mechanism B.

As the completed chenille strands are advanced through the tubes 125 and 125$a$ between the blades 201, 202 of the units U and U', the movable blades 202 are alternately actuated by the solenoids 212 in response to closing of the micro switches 256 and 257 by the pin 255 of the timing mechanism D, so as to cut each chenille strand into six inch lengths in accordance with the adjustment of the lever 243.

From the foregoing description, it will be manifest that the two chenille strands S and S' are produced in a continuous operation and are cut into predetermined lengths automatically so as to obtain maximum efficiency and economy in manufacturing the product, and that the compactness of the machine reduces to a minimum the floor space necessary for its installation, all to the end of enabling the product to be profitably marketed for a wide variety of users at a low cost.

It will be clearly understood that the term "wires" as applied to the members $a$, $b$, $c$, $d$ in describing the use of the machine for the manufacture of chenille strands for smoking pipe cleaners, plant ties and other products requiring the functional characteristics of metallic wires, is to be broadly construed where used in the claims, as covering any form of cord, thread, or other flexible member which would be used to form the chenille strand.

I claim:

1. In a chenille making machine, means for supporting thread in tube formation; means for winding thread on the first means; means for axially feeding convolutions of thread as wound on the first means so as to produce a tube of thread thereon; means for supporting pairs of wires at diametrically opposed points with respect to the thread tube, with one wire of each pair inside the tube and the other wire of each pair outside the tube; means for cutting through the thread tube diametrically and medially between the pairs of wires as the tube is being fed longitudinally; means for feeding and twisting the pairs of wires to medially grip the severed halves of the thread tube between the wires of the respective pairs; whereby to produce two chenille strands; cut-off devices, one for each chenille strand, receiving the respective strands from said feeding and twisting means; timing mechanism operable in synchronism with the feeding of the chenille strands; and means controlled by said timing mechanism, for actuating said cut-off devices to cut the chenille strands into predetermined lengths.

2. In a chenille making machine, means for supporting thread in tube formation; means for winding thread on the first means; means for axially feeding convolutions of thread as wound on the first means so as to produce a tube of thread thereon; means for supporting pairs of wires at diametrically opposed points with respect to the thread tube, with one wire of each pair inside the tube and the other wire of each pair outside the tube; means for cutting through the thread tube diametrically and medially between the pairs of wires as the tube is being fed longitudinally; means for feeding and twisting the pairs of wires to medially grip the severed halves of the thread tube between the wires of the respective pairs, whereby to produce two chenille strands; cut-off units, one for each chenille strand and including electro-responsive devices; and timing mechanism operatively associated with said feeding and twisting means to be driven in synchronism therewith; said timing mechanism including electric switches in circuit with a source of current supply and with said electro-responsive devices to actuate the respective cut-off units and cut the chenille strands into predetermined lengths.

3. In a chenille making machine, a tubular, stationary shaft; a former projecting from said shaft at one end thereof and having longitudinal grooves at opposed locations in the periphery thereof adapted to receive wires from the bore of said shaft; a winding element adapted to carry a supply of thread and being rotatably mounted on said shaft for winding of thread on said former; feed rollers; shafts to which said rollers are fixed; means mounting said shafts for rotation and for angular adjustment about a common fixed axis to dispose the feed rollers in an active position wherein their peripheries are adapted to engage a thread tube on said former, or an inactive position to permit access to said former; means urging said shafts about said axis to engage said rollers with the thread tube; means for driving said rollers in synchronism with said winding element to feed convolutions of thread axially on said former so as to produce a tube of thread moving longitudinally thereon; means for supporting other wires outside the thread tube in juxtaposition to the wires inside the tube; means for cutting through the thread tube diametrically as the tube is being fed on said former; and means for feeding and twisting each inside wire and the respective outside wire together so that same will grip a half of the thread tube to produce a chenille strand.

4. In a chenille making machine, a tubular, stationary shaft; a former projecting from said shaft at one end thereof and having longitudinal grooves at opposed locations in the periphery thereof adapted to receive wires from the bore of said shaft; a winding element adapted to carry a supply of thread and being rotatably mounted on said shaft for winding of thread on said former; feed rollers; shafts to which said rollers are fixed; means mounting said shafts for rotation and for angular adjustment about a common fixed axis to dispose the feed rollers in an active position wherein their peripheries are adapted to engage a thread tube on said former, or an inactive position to permit access to said former; means urging said shafts about said axis to engage said rollers with the thread tube; a driving gear mounted for rotation about said fixed axis and driven in synchronism with said winding element; driven gears fixed to said feed roller shafts and meshing with said driving gear to effect feeding of the convolutions of thread on said former by the feed rollers and thereby produce a tube of thread moving longitudinally on said former; said rollers having circumferential grooves adapted to receive other wires to support same outside the thread tube in juxtaposition to said wires inside the tube; means for cutting through the thread tube diametrically as the tube is being fed on said former; and means for feeding and twisting each inside wire and the respective outside wire together so that same will grip a half of the thread tube to produce a chenille strand.

5. In a chenille making machine, a tubular, stationary shaft; a former projecting from one end of said shaft and having longitudinal grooves at opposed locations in the periphery thereof adapted to receive wires from the bore of said shaft; a winding element adapted to carry a supply of thread and being rotatably mounted on said shaft for winding of thread on said former; feed rollers; shafts to which said rollers are fixed; means mounting said shafts for rotation and for angular adjustment about a common fixed axis to dispose the feed rollers in an active position wherein their peripheries are adapted to engage a thread tube on said former, or an inactive position to permit access to said former; means urging said shafts about said axis to engage said rollers with the thread tube; a driving gear mounted for rotation about said fixed axis and driven in synchronism with said winding element; driven gears fixed to said feed roller shafts and meshing with said driving gear to effect feeding of the convolutions of thread on said former by the feed rollers and thereby produce a tube of thread moving longitudinally on said former; said rollers having circumferential grooves adapted to receive other wires to support same outside the thread tube in juxtaposition to said wires inside the tube; said former having a diametric slot; a cutting blade mounted for reciprocating movement and working in said slot; a crank fixed to said driving gear; a connecting rod between said crank and cutting blade for actuating same to cut through the thread tube as it is being fed on said former; and means for feeding and twisting each inside wire and the respective outside wire together so that same will grip a half of the thread tube to produce a chenille strand.

CLAIR B. WELLER.

REFERENCES CITED

The following references are of record in the file of this patent:

UNITED STATES PATENTS

| Number | Name | Date |
|---|---|---|
| 263,492 | Dietzel | Aug. 29, 1882 |
| 366,729 | Johnson | July 19, 1887 |
| 370,148 | Landenberger | Sept. 20, 1887 |
| 817,965 | Eversmann | Apr. 17, 1906 |
| 1,039,876 | Wolkow | Oct. 1, 1912 |
| 1,585,357 | Anderson | May 18, 1926 |
| 1,927,292 | Neff et al. | Sept. 19, 1933 |
| 2,447,103 | Susey | Aug. 17, 1948 |
| 2,465,453 | Holbrook | Mar. 29, 1949 |
| 2,491,292 | Wilmsen | Dec. 13, 1949 |